United States Patent
Armentrout et al.

(10) Patent No.: US 8,439,567 B1
(45) Date of Patent: May 14, 2013

(54) DISC SPRINGS/CARRIER PLATE PRELOAD ASSEMBLY

(75) Inventors: Richard Witten Armentrout, Delmont, PA (US); Ryan Michael Voss, Pittsburgh, PA (US); Christopher Daniel Champion, Allison Park, PA (US); Richard Andrew Gronholm, Monroeville, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 89 days.

(21) Appl. No.: 13/288,618

(22) Filed: Nov. 3, 2011

Related U.S. Application Data

(60) Provisional application No. 61/412,048, filed on Nov. 10, 2010.

(51) Int. Cl.
*F16C 17/04* (2006.01)

(52) U.S. Cl.
USPC ............ 384/308; 384/122; 384/303; 384/306

(58) Field of Classification Search .................. 384/122, 384/303, 306, 308, 309, 312
See application file for complete search history.

(56) References Cited

U.S. PATENT DOCUMENTS

| | | | |
|---|---|---|---|
| 1,586,443 A | 5/1926 | Flintermann | |
| 2,002,913 A | 5/1935 | Mendenhall et al. | |
| 2,874,007 A * | 2/1959 | Cametti et al. ................ | 384/308 |
| 3,814,487 A * | 6/1974 | Gardner ........................ | 384/307 |
| 3,829,179 A | 8/1974 | Kurita et al. | |
| 4,335,925 A | 6/1982 | Stopp | |
| 4,403,873 A | 9/1983 | Gardner | |
| 4,473,310 A * | 9/1984 | Advani et al. ................ | 384/308 |
| 5,161,959 A | 11/1992 | Gettel | |
| 5,813,314 A | 9/1998 | Michiyuki et al. | |
| 6,394,387 B1 | 5/2002 | Mitrovic | |
| 7,066,651 B2 * | 6/2006 | Nicholas et al. ............... | 384/99 |
| 7,261,300 B2 * | 8/2007 | Agrawal et al. ............... | 277/399 |
| 7,300,263 B2 | 11/2007 | Mitsuda et al. | |
| 7,625,121 B2 * | 12/2009 | Pettinato et al. ............... | 384/99 |
| 2004/0057642 A1 * | 3/2004 | New ............................. | 384/122 |
| 2005/0147512 A1 * | 7/2005 | Chen et al. ................... | 417/423.12 |
| 2007/0261932 A1 | 11/2007 | Zagrodzki et al. | |
| 2008/0013872 A1 * | 1/2008 | Geiger ......................... | 384/309 |
| 2012/0020598 A1 * | 1/2012 | New et al. ..................... | 384/122 |
| 2012/0063711 A1 * | 3/2012 | Byrne et al. .................. | 384/122 |

* cited by examiner

*Primary Examiner* — Thomas R Hannon
*Assistant Examiner* — Kashif Mohammed
(74) *Attorney, Agent, or Firm* — Reed Smith LLP

(57) ABSTRACT

A preload assembly for a thrust bearing. The preload assembly includes a carrier plate having a central annular protrusion, wherein the annular protrusion has an inner diameter and an outer diameter; an inner disc spring; an outer disc spring; and a housing having an annular channel for housing the carrier plate, the inner disc spring, and the outer disc spring.

11 Claims, 7 Drawing Sheets

DISC SPRINGS/CARRIER PLATE PRELOAD ASSEMBLY

RELATED APPLICATIONS

This application claims benefit under 35 U.S.C. §119(e) of the earlier filing date of U.S. Provisional Application Ser. No. 61/412,048 filed on Nov. 10, 2010.

FIELD OF INVENTION

The invention relates generally to a preload assembly for a thrust bearing, and in particular a preload assembly for a thrust bearing including a carrier plate and disc spring combination.

BACKGROUND OF THE INVENTION

Thrust bearings are a type of bearing which support an axial load while permitting rotation of a shaft, for example, a rotary shaft of a pump. Fluid film thrust bearings typically comprise a circumferential array of pads that support the thrust load through hydrodynamic fluid films between the individual pads and the rotating thrust runner. Supporting the pads, there is usually a load-equalizing linkage mechanism having pivotally-connected overlapping links that keep the loads nearly uniform among the pads. In double-acting thrust bearings, having two sets of pads on opposite sides of the runner to accommodate thrust load reversals, there is often an elastic preloading mechanism within the load-equalizing linkage to maintain some nominal loading in the inactive (non-loaded) side. Typical preload mechanisms include coil springs, wave washers or elastomeric o-rings.

A need, however, exists for an improved preload assembly.

SUMMARY OF THE INVENTION

In accordance with an embodiment of the invention, the invention provides a preload assembly for a thrust bearing, and in particular a preload assembly for a thrust bearing including a carrier plate and disc spring combination for use in a nuclear reactor coolant pump. Specifically, an embodiment of a preload assembly for a thrust bearing includes a carrier plate having a central annular protrusion, wherein the annular protrusion has an inner diameter and an outer diameter; an inner disc spring having an inner diameter and an outer diameter; an outer disc spring having an inner diameter and an outer diameter; and a housing having an annular channel for housing the carrier plate, the inner disc spring, and the outer disc spring. The annular channel has a housing floor, an inner diameter and an outer diameter. The inner diameter of the inner disc spring contacts an annular support disposed at the inner diameter of the housing channel. The outer diameter of the inner disc spring contacts the inner diameter of the annular protrusion of the carrier plate. The inner diameter of the outer annular disc spring contacts the outer diameter of the protrusion of the carrier plate. The outer diameter of the outer disc spring contacts an annular support disposed at the outer diameter of the housing channel.

BRIEF DESCRIPTION OF THE DRAWINGS

For the invention to be clearly understood and readily practiced, the invention will be described in conjunction with the following FIGS., wherein like reference characters designate the same or similar elements, which FIGS. are incorporated into and constitute a part of the specification, wherein.

DETAILED DESCRIPTION OF THE INVENTION

Figure 1A:
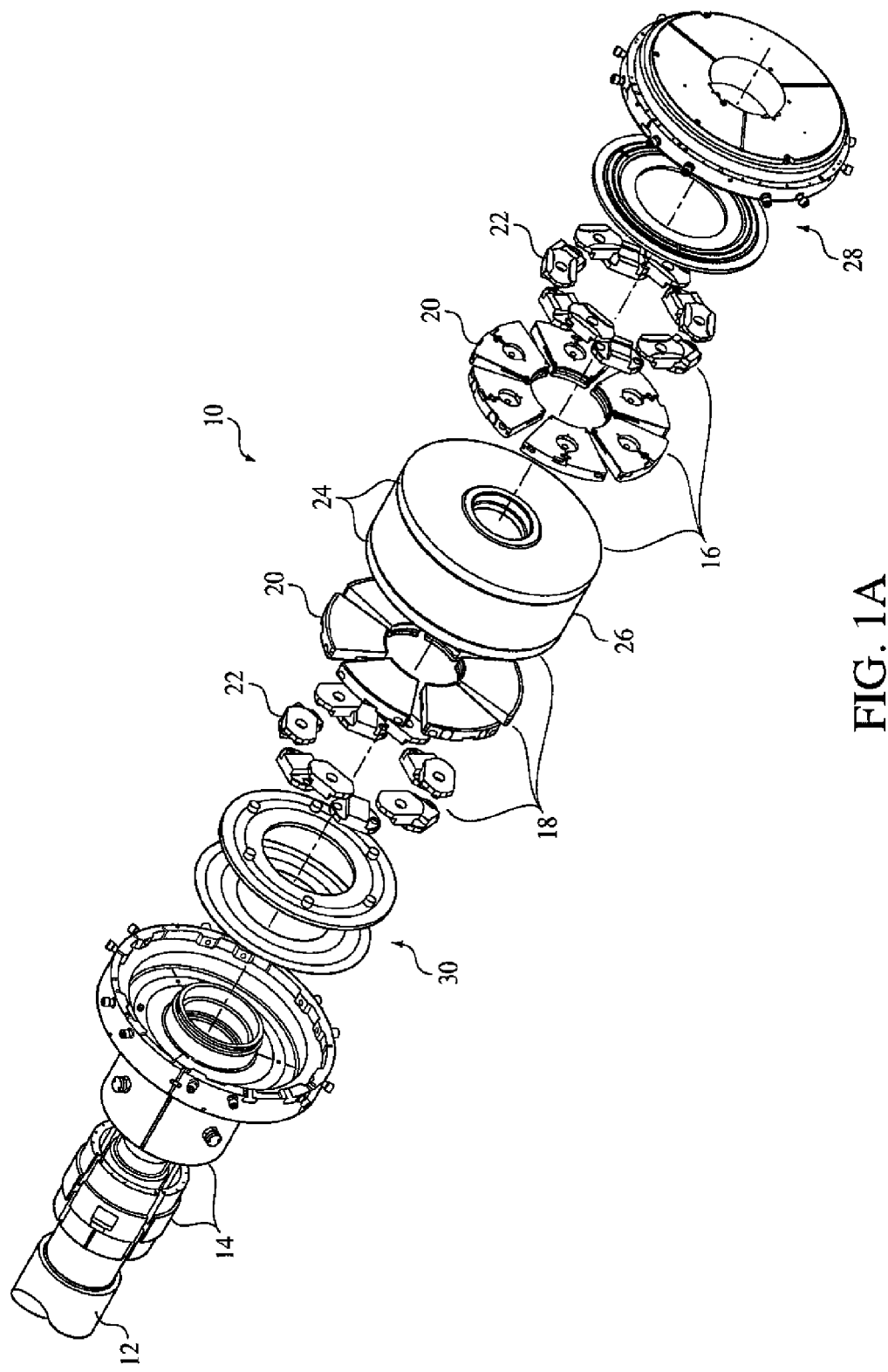
FIG. 1A is an exploded view of a lower bearing assembly according to an embodiment of the invention.

It is to be understood that the FIGS. and descriptions of the invention have been simplified to illustrate elements that are relevant for a clear understanding of the invention, while eliminating, for purposes of clarity, other elements that may be well known. Those of ordinary skill in the art will recognize that, such as, for example, all of the components of the reactor coolant pumps other than as shown in the FIGS. have not been described in detail herein for the purpose of simplifying the specification of the patent application.

For purposes of the description hereinafter, the terms "upper", "lower", "vertical", "horizontal", "axial", "top", "bottom", "aft", "behind", and derivatives thereof shall relate to the invention, as it is oriented in the drawing FIGS. However, it is to be understood that the invention may assume various alternative configurations except where expressly specified to the contrary. It is also to be understood that the specific elements illustrated in the FIGS. and described in the following specification are simply exemplary embodiments of the invention. Therefore, specific dimensions, orientations and other physical characteristics related to the embodiments disclosed herein are not to be considered limiting.

The detailed description will be provided hereinbelow with reference to the attached drawings. In the drawings, like reference characters designate corresponding parts throughout the views.

Referring to FIG. 1A, there is illustrated an exploded view of a thrust bearing assembly designated by reference numeral 10. Thrust bearing assembly 10 is the one of a pair of thrust bearing assemblies disposed about a rotatable shaft 12 of a pump. Thrust bearing assembly 10 is a water lubricated, double-acting thrust bearing requiring a preload be maintained on both the active (loaded) and inactive (preloaded) sides of the bearing throughout its operation. Maintaining a preload on the inactive side is required to prevent detrimental effects such as shoe flutter and pivot impacting in the unloaded linkage. Thrust bearing assembly 10 includes a radial bearing 14, a lower thrust bearing 16 and an upper thrust bearing 18. Each of the thrust bearings include a thrust shoe assembly 20 disposed in between a linkage assembly 22 and a runner 24. A flywheel 26 is disposed on the shaft 12 between the upper thrust bearing 18 and the lower thrust bearing 16. The linkage assembly 22, a thrust shoe assembly 20, and runner 24 of each thrust bearing 16, 18 are disposed on the shaft 12 in reverse order to each other such that the runner 24 of each thrust bearing is disposed adjacent to the flywheel 26. A lower preload assembly 28 applies a preload force on the lower thrust bearing 16, while an upper preload assembly 30 applies a preload force on the upper thrust bearing 18. The flywheel 26 and runners 24 are disposed on the shaft 12 to rotate with the shaft 12, while the linkage assemblies 22, shoe assemblies 20 and preload assemblies 28, 30 do not rotate with shaft 12.

Figure 1B:
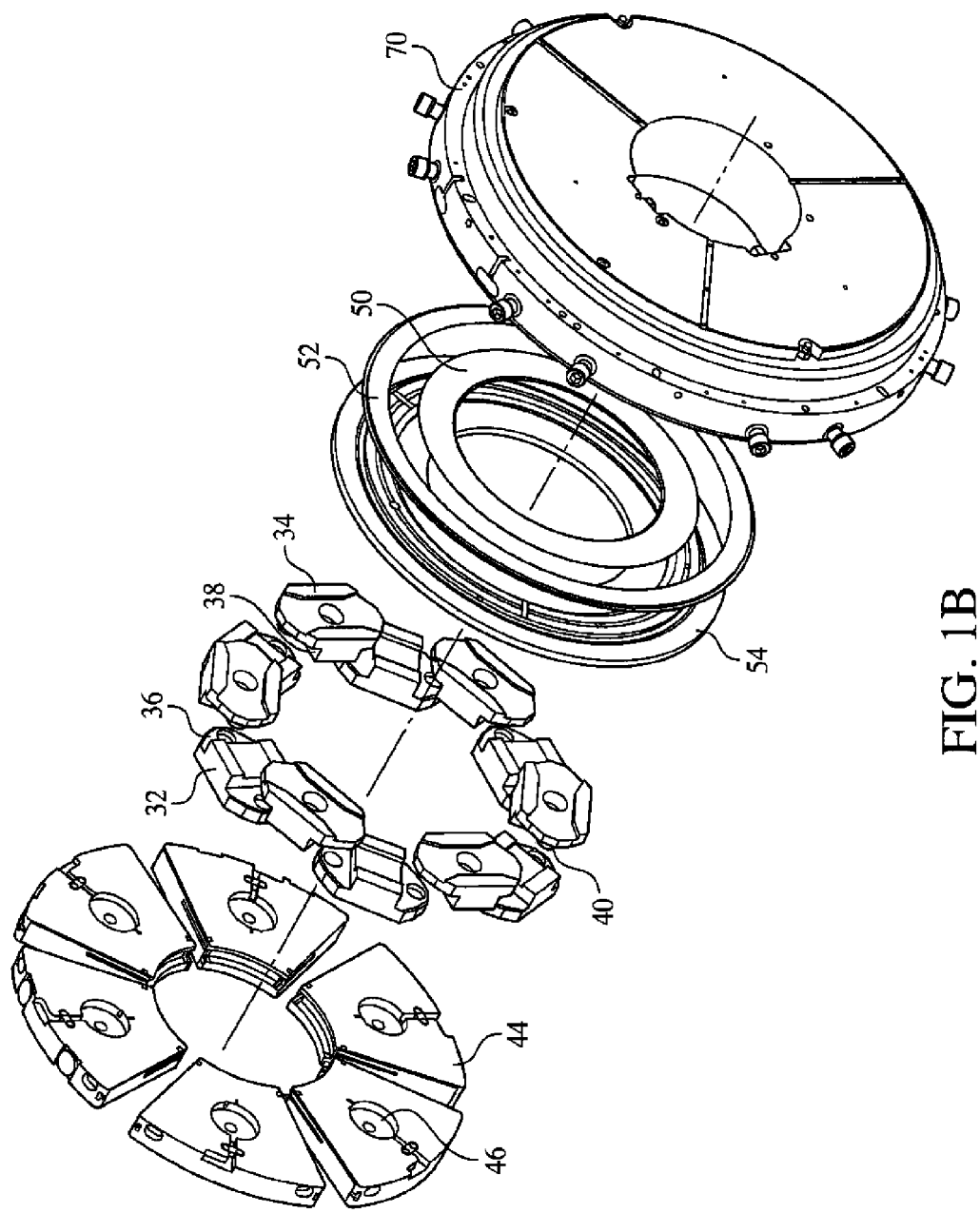
FIG. 1B is an exploded view of a lower bearing assembly according to an embodiment of the invention.

Referring to FIG. 1B, the lower thrust bearing 16 and lower preload assembly 28 are described below. One of ordinary skill in the art would understand that this description also applies to the upper thrust assembly 18. Linkage assembly 22 includes a number of circumferentially spaced pad links 32 in alternating and overlapping relationship with a number of housing links 34. Pad links 32 have a recessed portion 36 at each end while housing links 34 have corresponding recessed portions 38 on ends thereof. Recessed portions 36 and 38 and of adjacent pad links 32 and housing links 34 are pivotally connected together by pivot pins 40. Housing links further include a central recess 42 in a central portion of the underside of each housing link 34 (FIG. 2B).

Thrust shoe assembly 20 (FIG. 1A) includes wedge-shaped spaced thrust pads 44. Each thrust pad 44 has a central recess 46 for engaging a corresponding pin 48 mounted to a central portion of each pad link 32 (FIG. 2A).

Preload assembly 28 (FIG. 1B) includes an inner disc spring 50 (FIG. 2A), and outer disc spring 52 and a carrier plate 54. The inner disc spring 50 has an inner diameter 56 and an outer diameter 58. The outer disc spring 52 has an inner diameter 60 and an outer diameter 62. The carrier plate 54 has a central annular protrusion 64, wherein the annular protrusion 64 has an inner diameter 66 and an outer diameter 68.

Figure 2A:
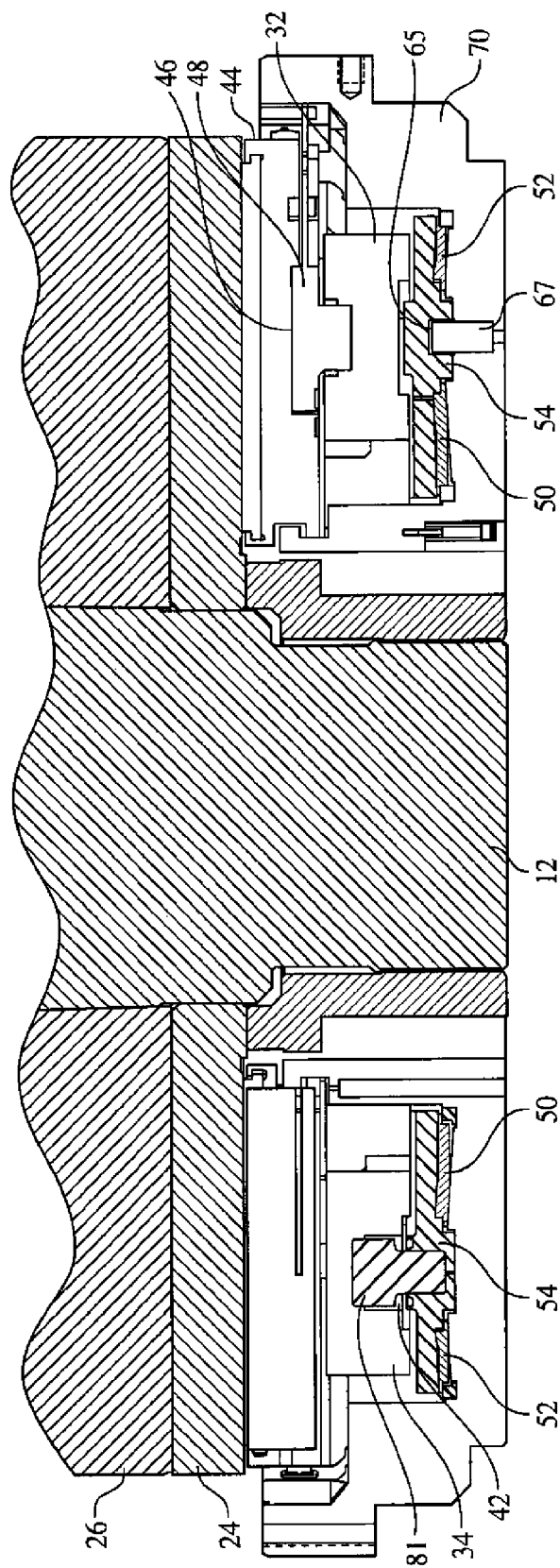
FIG. 2A is a cross-section of the lower bearing assembly of FIG. 1B.
Figure 2B:
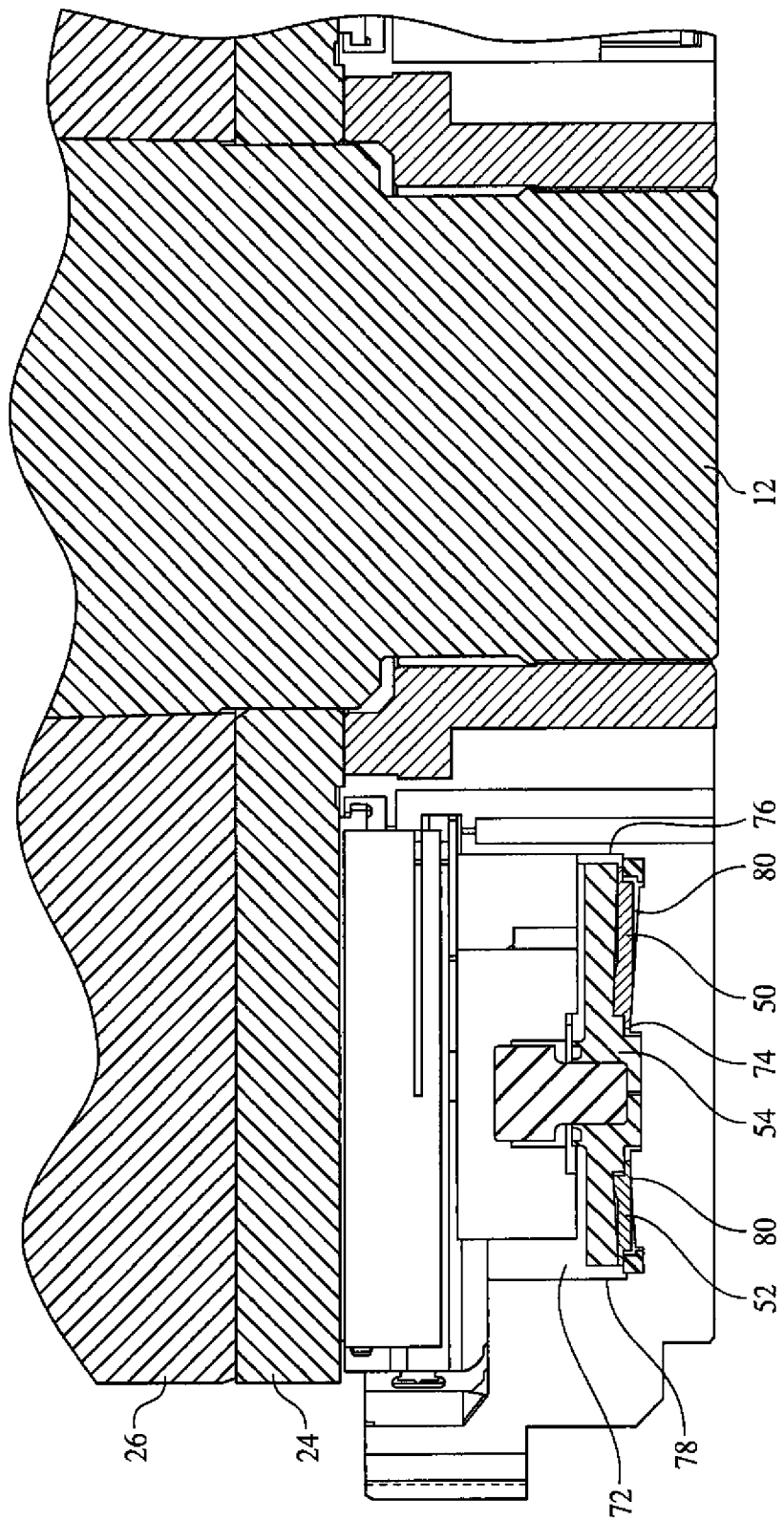
FIG. 2B is a close-up view of the left-hand portion of FIG. 2A.
Figure 2C:
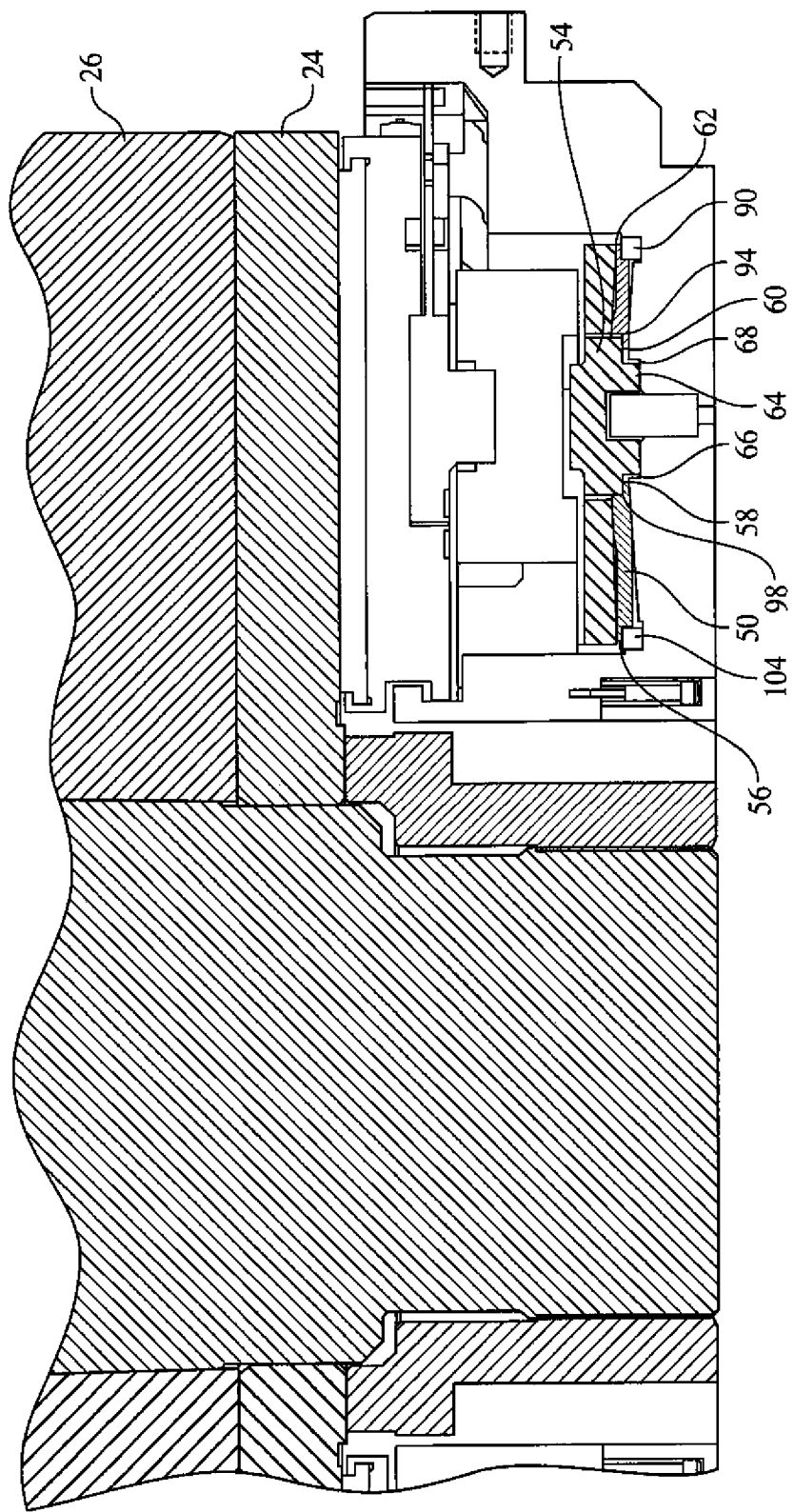
FIG. 2C is a close-up view of the right-hand portion of FIG. 2A.

Referring to FIGS. 2A, 2B, 2C, a stationary housing 70 includes an annular channel 72 for housing the carrier plate 54, the inner disc spring 50, and the outer disc spring 52. The annular channel 72 has a housing floor 74, an inner diameter 76 and an outer diameter 78. The inner diameter 56 of the inner disc spring 50 contacts an annular support or washer insert 104 (FIG. 2C) disposed at the inner diameter 76 of the annular channel 72, and the outer diameter 58 of the inner disc spring contacts the inner diameter 66 of the annular protrusion 64 of the carrier plate 54. The inner diameter 60 of the outer disc spring 52 contacts the outer diameter 68 of the protrusion 64 of the carrier plate 54. The outer diameter 62 of the outer disc spring 52 contacts an annular support or washer insert (FIG. 2C) disposed at the outer diameter 62 of the annular channel 72. The stationary housing 70 for the upper preload assembly 30 is disposed within the housing of the radial bearing 14.

The inner disc spring 50, outer disc spring 52 and the carrier plate 54 are all able to move axially with respect to the housing floor 74 a defined amount to be able to apply a required preload force on the linkage assembly 22 and ultimately the thrust shoe assembly 20. The amount of axial motion the preload assembly 28, 30 accepts accounts for bearing endplay, film thickness and the preload displacement. The stroke of the assembly is controlled via contact of the carrier plate 54 and the housing floor 74.

Inner and outer disc springs 50, 52 are belleville-type springs each having a frustoconical shape (see FIG. 2A) giving the disc spring 50, 52 its spring characteristic. Inner disc spring 50 and outer disc spring 52 are arranged concentrically about the shaft 12 such that the inner disc spring 50 is closer to the shaft 12. The frustoconical shape of inner disc spring 50 is arranged in the opposite direction to the frustoconical shape of outer disc spring 52 wherein the inner disc spring 50 is in an upside-down position. In order to keep the carrier plate 54 in equilibrium, the inner-to-outer spring force ratio accommodates the shifted center of gravity of the carrier plate 54 cross-section. Hence, the spring force of the inner disc spring 50 is intentionally slightly greater than the spring force of the outer disc spring 52 to maintain moment equilibrium.

Figure 4:
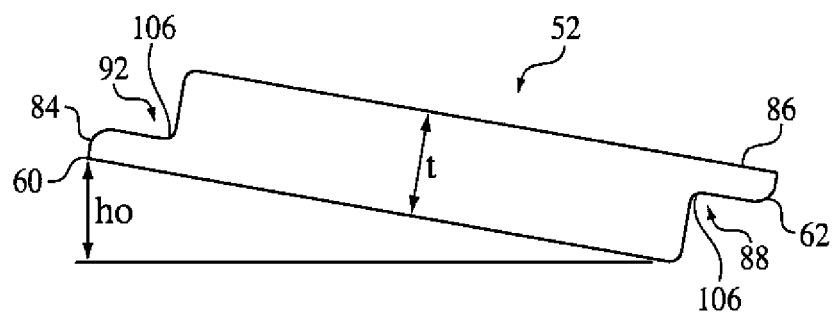
FIG. 4 is a cross-sectional view of the outer disc spring.

The inner and outer disc springs 50, 52 maintain a regressive spring characteristic and provide relatively constant axial stiffness over the expected operating range. Specifically, the geometry of the inner and outer disc springs 50, 52 maintains a regressive spring characteristic (ho/t) for this preload design. Preferably, spring characteristic (ho/t) is less than 1.4, where ho is the dish height of the disc spring and t is the thickness of the disc spring (FIG. 4). By doing so, the stiffness of each disc spring tends to progressively decrease as the deflection is increased. For the intended operating range of deflection, the stiffness is relatively constant—varying less than 10% over the expected operating range.

The inner and outer disc springs 50, 52 are thin in profile (outer diameter/thickness >50) to control operating stresses and provide the required axial stiffness. The inner and outer disc springs 50, 52 are narrow (outer diameter/inner diameter <1.75) but have unequal radial widths to control and equilibrate operating stresses for the required preload level wherein the inner and outer disc springs 50, 52 are of different sizes and have opposing and unequal dish angles to yield similar axial forces and similar peak stresses. The disc springs 50, 52 provide an axially symmetric preload force, and this when combined with the controlled axial displacements noted below and the stiffness of the carrier plate 54, result in a circumferentially uniform preload in the event of a broken disc spring.

The carrier plate 54, housing 70, and disc springs 50, 52 limit the axial deflection through a snubbing contact between the carrier plate 54 and housing floor 74, having a set initial clearance, and prevent disc spring operation near the "snap-through", or bifurcation point. Thus, disc springs 50, 52 may only move a certain distance before contacting the housing floor 74.

The carrier plate 54, inner and outer disc springs 50, 52, and the housing 70 provide squeeze film damping and provide barriers to debris. A squeeze film 80 arises from opening and closing (pumping) within the clearance space between the disc springs 50, 52 and housing floor 74. The design specifics include clearance controls and relative angles at the housing and spring interfaces. These specifics also include special sizing of the orifices to control the transfer rate of the fluid volume during both swash plate induced circumferential articulation and during bearing axial load reversal. This is beneficial in attenuating the swash plate-induced articulation modes of the linkage, preventing the potential for "rattle" as the linkage responds to the runner motions imposed on the linkage. It also provides beneficial rotor axial damping as the rotor translates during a load reversal from the lower thrust bearing 16 to the upper thrust bearing 18 or vise versa.

Figure 3:
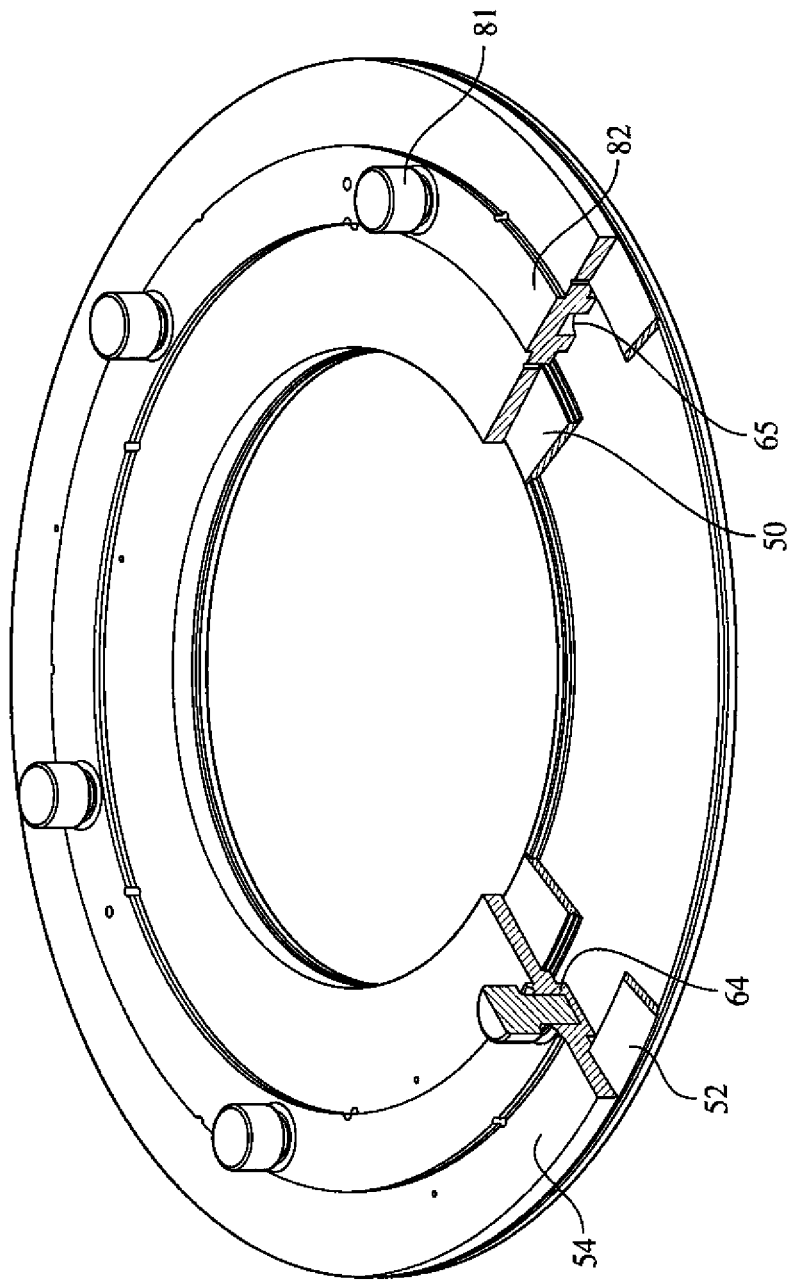
FIG. 3 is a perspective view of the inner and outer disc springs and the carrier plate.

Carrier plate 54 is disc shaped and has a substantially plus-shaped cross-section with the central annular protrusion 64 forming the bottom leg of the plus. The top leg 82 of the carrier plate includes a plurality of circumferentially spaced support pins 81 for contacting central recess 42 of housing links 34 (FIG. 2A). The plus-shape provides a structurally integral load path between the support pins 81 and the adjacent inner and outer disc springs 50, 52. Carrier plate 54 is concentrically arranged in between the inner disc spring 50 and outer disc spring 52 such that it separates and contacts the top surfaces of the two disc springs 50, 52. The central annular protrusion 64 of the plus-shape provides the ability to bottom against the housing floor 74 while maintaining the required squeeze film clearance between the disc springs 50, 52 and the bearing housing floor 74. The central annular protrusion 64 further includes three recesses 65, one of which is shown in FIGS. 2C and 3. Each recess 65 is adapted to receive one of three anti-rotation pins 67, one of which is shown in FIG. 2C. Each anti-rotation pin 67 extends upwardly from the housing floor 74 into a recess 65 to prevent rotation of the respective linkage assembly 22 and preload assembly 28, 30.

Figure 5:
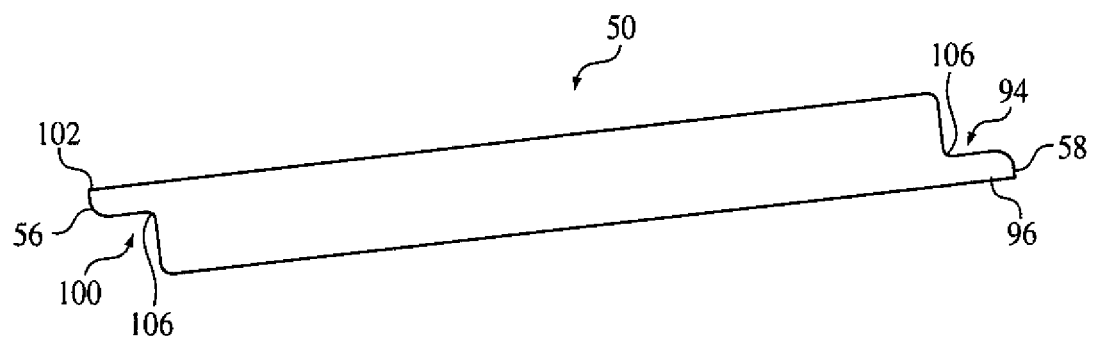
FIG. 5 is a cross-sectional view of the inner disc spring.

Each of the inner and outer disc springs 50, 52 have portions of narrowed thickness or edge wings at each of their inner and outer diameters (FIGS. 4 and 5). The edge wings 84,86 of outer disc spring 52 place the contact planes at the neutral axes of the operating stresses, thus minimizing stresses and radial motion at the contact location engagement points, at the carrier plate 54 and housing 70 and provide infinite life, with regard to cyclic fatigue and fretting fatigue. The edge wings 84, 86 were intentionally designed at the inner diameter and outer diameter of each disc spring 50, 52 to minimize the amount of radial motion at the contact locations and thereby reduce the potential for damage due to fretting over the 60-year design life of the bearing. The "corner" material is removed from each disc spring 50, 52 to place the neutral axis approximately at the mid-thickness of each edge wing 84, 86 for the intended deflection operating range, thereby minimizing the amount of radial slip that can occur at the contact diameters.

In outer disc spring 52 (FIG. 4), the bottom corner 88 of the outer diameter 62 is removed resulting in a narrowed thickness portion 86 in the upper corner of the outer diameter 62 of outer disc spring 52. The narrowed thickness portion 86 of the outer diameter 62 of outer disc spring 52 is supported by the washer insert 90 (FIG. 2C) disposed at the outer diameter 78 of the annular channel 72. The upper corner 92 of the inner diameter 60 of outer disc spring 52 is removed resulting in a narrowed thickness portion 84 in the bottom corner of the inner diameter 60 of outer disc spring 52. The narrowed thickness portion 84 in the bottom corner of the inner diameter 60 of outer disc spring 52 contacts a stepped portion 94 on the outer diameter 68 of the central protrusion 64 of carrier plate 54.

In inner disc spring 50 (FIG. 5), the upper corner 94 of the outer diameter 58 is removed resulting in a narrowed thickness portion 96 in the bottom corner of the outer diameter 58 of the inner disc spring 50. The narrowed thickness portion 96 in the bottom corner of the outer diameter 58 of the inner disc spring 50 contacts a stepped portion 98 on the inner diameter 66 of the central protrusion 64 of carrier plate 54. The bottom corner 100 of the inner diameter 56 of the inner disc spring 50 is removed resulting in a narrowed thickness portion 102 in the upper corner of the inner diameter 56 of the inner disc spring 50. The narrowed thickness portion 102 in the upper corner of the inner diameter 56 of the inner disc spring 50 is supported by a washer insert 104 disposed at the inner diameter 76 of the annular channel 72. Each of the areas of removed corners or notches includes a fillet radius 106. Furthermore, since the neutral axis during operation is close to the notches (fillet radii) in the edge wings 84, 86, 96, 102 the stress levels in the vicinity of these stress risers are low—thereby maintaining suitable peak stresses with regard to fatigue life.

This invention was necessitated by the poor lubrication properties of the fluid (water), the high preload force requirement, a need for axial damping, and the requirements for long life (60 years) with no maintenance. The resulting design meets these requirements by providing nearly zero sliding motion to mitigate fretting susceptibility, a high preload force, infinite fatigue life, squeeze film damping through a trapped liquid volume, and the ability to maintain a circumferentially uniform preload force in the unlikely event of one disc spring breaking.

Nothing in the above description is meant to limit the invention to any specific materials, geometry, or orientation of elements. Many parts/orientation substitutions are contemplated within the scope of the invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A preload assembly for a thrust bearing comprising:
    a carrier plate having a central annular protrusion, wherein the annular protrusion has an inner diameter and an outer diameter;
    an inner disc spring having an inner diameter and an outer diameter;
    an outer disc spring having an inner diameter and an outer diameter; and
    a housing having an annular channel for housing the carrier plate, the inner disc spring, and the outer disc spring, wherein the annular channel has a housing floor, an inner diameter and an outer diameter;
    wherein the inner diameter of the inner disc spring contacts an annular support disposed at the inner diameter of the housing channel, and wherein the outer diameter of the inner disc spring contacts the inner diameter of the annular protrusion of the carrier plate; and
    wherein the inner diameter of the outer annular disc spring contacts the outer diameter of the protrusion of the carrier plate, and wherein the outer diameter of the outer disc spring contacts an annular support disposed at the outer diameter of the housing channel.

2. The assembly of claim 1 wherein the carrier plate, the inner disc spring, the outer disc spring, and the housing provide a preload force on the thrust bearing.

3. The assembly of claim 1 wherein the inner disc spring and outer disc spring have edge wings comprising portions of narrowed thickness at the inner and outer diameters of the inner and outer disc springs.

4. The assembly of claim 1 wherein the inner and outer disc springs are thin in profile having an outer diameter/thickness >50.

5. The assembly of claim 1 wherein the inner and outer disc springs are narrow having an outer diameter/inner diameter <1.75, and wherein the inner and outer disc springs have unequal radial widths.

6. The assembly of claim 1 wherein the inner and outer disc spring are of different sizes and have opposing and unequal dish angles.

7. The assembly of claim 1 wherein the disc springs keep the carrier plate in equilibrium, and provide a circumferentially uniform preload in the event of a broken disc spring.

8. The assembly of claim 1 wherein the carrier plate, housing, and disc springs limit the axial deflection between the carrier plate and housing floor.

9. The assembly of claim 1 wherein the carrier plate, inner and outer disc springs, and the housing provide squeeze film damping and provide barriers to debris.

10. The assembly of claim 1 wherein the disc springs maintain a regressive spring characteristic, wherein the stiffness of each disc spring decreases as the deflection is increased and wherein the disc springs provide a relatively constant axial stiffness for the intended operating range of deflection.

11. The assembly of claim 1 wherein the annular protrusion of the carrier plate has at least one recess adapted for receiving an anti-rotation pin extending from the housing floor.

* * * * *